(Model.)
L. W. WOOD & W. MORLEY.
NOSE RING FOR SWINE.
No. 353,651.  Patented Nov. 30, 1886.
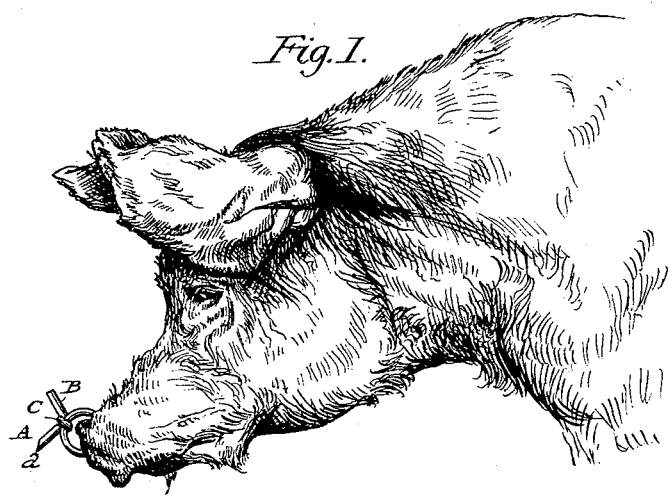
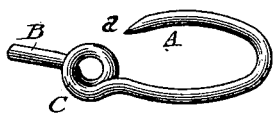
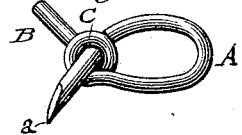
Witnesses.
S. D. Young
Jay Sullivan
Inventors.
Leander W. Wood
William Morley

UNITED STATES PATENT OFFICE.

LEANDER W. WOOD AND WILLIAM MORLEY, OF FONTANELLE, IOWA.

NOSE-RING FOR SWINE.

SPECIFICATION forming part of Letters Patent No. 353,651, dated November 30, 1886.

Application filed July 19, 1886. Serial No. 208,440½. (Model.)

*To all whom it may concern:*

Be it known that we, LEANDER W. WOOD and WILLIAM MORLEY, citizens of the United States, residing at Fontanelle, in the county of Adair and State of Iowa, have invented certain new and useful Improvements in Hog-Rings; and we do hereby declare that the following is a full, clear, and exact description of the invention, which will enable others skilled in the art to which it appertains to make and use the same.

Our invention relates to an improvement in nose-rings for animals; and it consists in the construction of the same, which will be more fully hereinafter described, and pointed out in the claims.

Heretofore nose-rings have been made of a single strip of wire bent up and having one end forced through an eye or loop on the opposite end; but, as far as we have been able to learn, such rings have been but partly successful in their operation.

The object of our invention is to provide a nose-ring for swine that will be simple in its construction, effective in its working, strong and durable, easily applied, and cheaply manufactured. We attain these objects by the device illustrated in the accompanying drawings, wherein like letters of reference indicate similar parts in the several views, and in which—

Figure 1 is a perspective view of a head of an animal with our improved ring secured in its snout, and showing the position that its projecting ends assume when properly adjusted. Fig. 2 is a perspective view of our improved ring in a proper shape to be applied. Fig. 3 is a similar view showing the manner of securing the ring when applied.

In the drawings, A represents a piece of wire of suitable length and thickness, said wire being coiled and bent to form a loop or eye, C, a short distance from one end thereof, thereby forming the short prong B and long prong *a*.

The prong *a* of the wire A is bent up and slightly out and formed into a hook-shaped curve, its end coming directly opposite to the loop C, as shown in Fig. 2, leaving a space between said loop and the end of the prong *a* of sufficient width to allow the snout of the animal to be placed between the same. This end of the prong *a* is purposely made pointed, so as to allow of easy insertion thereof into the snout of the animal, through which it passes.

In applying the ring the snout of the animal is placed between the end of prong *a* and the loop C, and the hook-shaped portion of the wire is forced through its snout, and, said end being then directly opposite to the loop C, it is bent down into and beyond the same, leaving an extended end on the opposite side of the loop of a length corresponding to the length of the opposite prong, B, and by its being forced downward through the loop it is held at nearly right angles to the same, thus forming a series of prongs, one extending upward and the other downward, as shown. It will thus be seen that when the animal attempts to force its nose in the earth the two prongs B *a*, by coming in contact therewith, will turn and twist the ring in the snout at every movement of the head, and the pain caused thereby will accomplish the desired result of the immediate withdrawal of the nose.

It is obvious that many minor changes can be made in the construction and arrangement of our device without departing in the least from the nature and principle of our invention.

Having thus described our invention, what we claim as new, and wish to secure by Letters Patent, is—

1. As an article of manufacture, a nose-ring constructed of a single wire having a loop, C, formed therewith, and prongs formed by the ends of said wire and extending beyond the loop, substantially as described.

2. A nose-ring constructed of a single wire, A, a loop, C, formed therewith, and having an extension or prong, B, and the prong *a*, adapted to be passed through the loop C, substantially as described.

LEANDER W. WOOD.
WILLIAM MORLEY.

Witnesses:
JAY SULLIVAN,
W. C. HIBBS.